(12) United States Patent
Kinsey

(10) Patent No.: US 10,709,103 B1
(45) Date of Patent: Jul. 14, 2020

(54) ANIMAL CRATE COOLING SYSTEM

(71) Applicant: Erick Kinsey, New Port Richey, FL (US)

(72) Inventor: Erick Kinsey, New Port Richey, FL (US)

(*) Notice: Subject to any disclaimer, the term of this patent is extended or adjusted under 35 U.S.C. 154(b) by 203 days.

(21) Appl. No.: 16/043,403

(22) Filed: Jul. 24, 2018

(51) Int. Cl.
*A01K 1/00* (2006.01)
*F25D 3/12* (2006.01)

(52) U.S. Cl.
CPC .......... *A01K 1/0082* (2013.01); *A01K 1/0058* (2013.01); *F25D 3/12* (2013.01); *A01K 1/0052* (2013.01)

(58) Field of Classification Search
CPC ....... A01K 1/0082; A01K 1/0047; A01K 1/03
See application file for complete search history.

(56) References Cited

U.S. PATENT DOCUMENTS

| | | | | |
|---|---|---|---|---|
| 4,827,872 A * | 5/1989 | Sommers | | A01K 1/033 |
| | | | | 119/482 |
| 5,727,503 A * | 3/1998 | Whittaker | | A01K 1/0236 |
| | | | | 119/500 |
| 5,887,436 A * | 3/1999 | Duddleston | | A01K 1/0236 |
| | | | | 119/500 |
| 5,975,025 A | 11/1999 | Kangas | | |
| 6,490,995 B2 | 12/2002 | Greene, Jr. | | |
| 7,730,740 B2 | 6/2010 | Keller | | |
| 7,779,645 B2 | 8/2010 | Heimbach | | |
| 7,934,472 B2 | 5/2011 | Weatherford | | |
| 8,291,866 B2 * | 10/2012 | Cauchy | | A01K 1/0236 |
| | | | | 119/482 |
| 8,757,096 B2 * | 6/2014 | Doumas | | A01K 13/001 |
| | | | | 119/606 |
| D717,005 S | 11/2014 | Skaggs | | |
| 2002/0184895 A1 * | 12/2002 | Anderson | | F25B 21/04 |
| | | | | 62/3.6 |
| 2006/0249093 A1 * | 11/2006 | Fuksa | | A01K 1/0047 |
| | | | | 119/482 |
| 2008/0060586 A1 * | 3/2008 | Lewis, Jr. | | A01K 1/0353 |
| | | | | 119/500 |
| 2009/0320390 A1 | 12/2009 | Kolozsvari | | |
| 2017/0223922 A1 * | 8/2017 | Loopesko | | A01K 1/0082 |

FOREIGN PATENT DOCUMENTS

| | | | | |
|---|---|---|---|---|
| EP | 3440927 A1 * | 2/2019 | | A01K 1/0082 |
| WO | 2006127110 | 11/2006 | | |
| WO | WO-2008001479 A1 * | 1/2008 | | A01K 1/0082 |

* cited by examiner

Primary Examiner — Kristen C Hayes
(74) Attorney, Agent, or Firm — Kyle A. Fletcher, Esq.

(57) ABSTRACT

The animal crate cooling system comprises a thermal cover for an animal crate and a cold air unit The cold air unit generates and circulates cool air through the crate. The thermal cover comprises a plurality of thermally insulated panels that surround the sides and top of the crate. One or more apertures in the top of the thermal cover allow air to enter and/or exit the crate. The cold air unit utilizes carbon dioxide gas from an attached CO2 cylinder to make dry ice by blowing the CO2 into a mesh basket within the cold air unit. One or more air moving devices may circulate cool air from the cold air unit over the dry ice and through the crate. The air moving devices may be powered by a battery, which may be recharged using a solar panel.

18 Claims, 6 Drawing Sheets

ANIMAL CRATE COOLING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of pet care, more specifically, an animal crate cooling system.

SUMMARY OF INVENTION

The animal crate cooling system comprises a thermal cover for an animal crate and a cold air unit. The cold air unit generates and circulates cool air through the crate. The thermal cover comprises a plurality of thermally insulated panels that surround the sides and top of the crate. One or more apertures in the top of the thermal cover allow air to enter and/or exit the crate. The cold air unit utilizes carbon dioxide gas from an attached CO2 cylinder to make dry ice by blowing the CO2 into a mesh basket within the cold air unit. One or more air moving devices may circulate cool air from the cold air unit over the dry ice and through the crate. The air moving devices may be powered by a battery which may be recharged using a solar panel.

An object of the invention is to control the temperature of an animal in a crate.

Another object of the invention is to provide a thermal cover to surround the side and top of the crate.

A further object of the invention is to generate cool air using a cold air unit and to circulate cool air through the crate.

Yet another object of the invention is to provide a battery charged by a solar panel to operate one or more air moving devices placed on the thermal cover.

These together with additional objects, features and advantages of the animal crate cooling system will be readily apparent to those of ordinary skill in the art upon reading the following detailed description of the presently preferred, but nonetheless illustrative, embodiments when taken in conjunction with the accompanying drawings.

In this respect, before explaining the current embodiments of the animal crate cooling system in detail, it is to be understood that the animal crate cooling system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the animal crate cooling system.

It is therefore important that the claims be regarded as including such equivalent construction insofar as they do not depart from the spirit and scope of the animal crate cooling system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
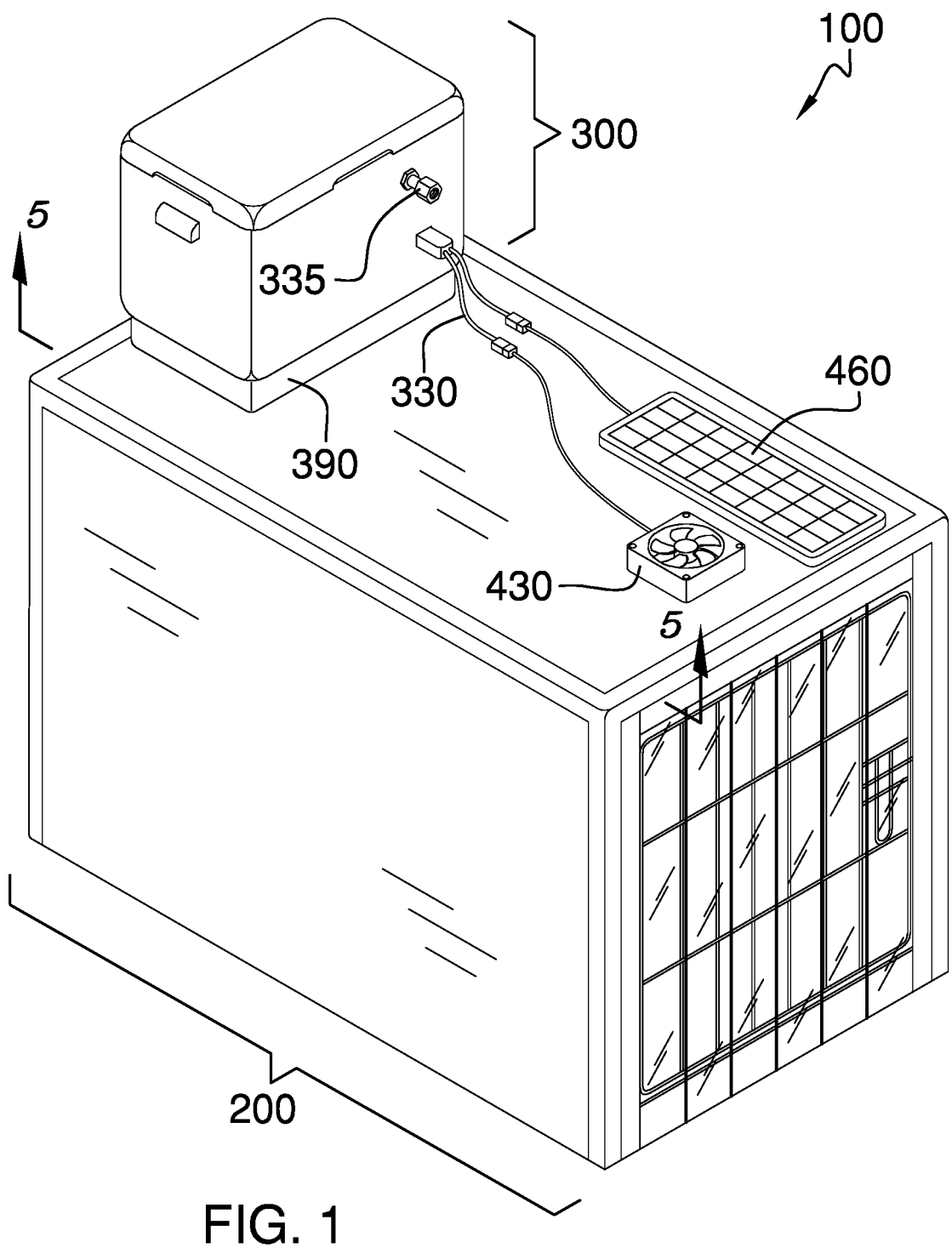
FIG. 1 is a perspective view of an embodiment of the disclosure.
Figure 2:
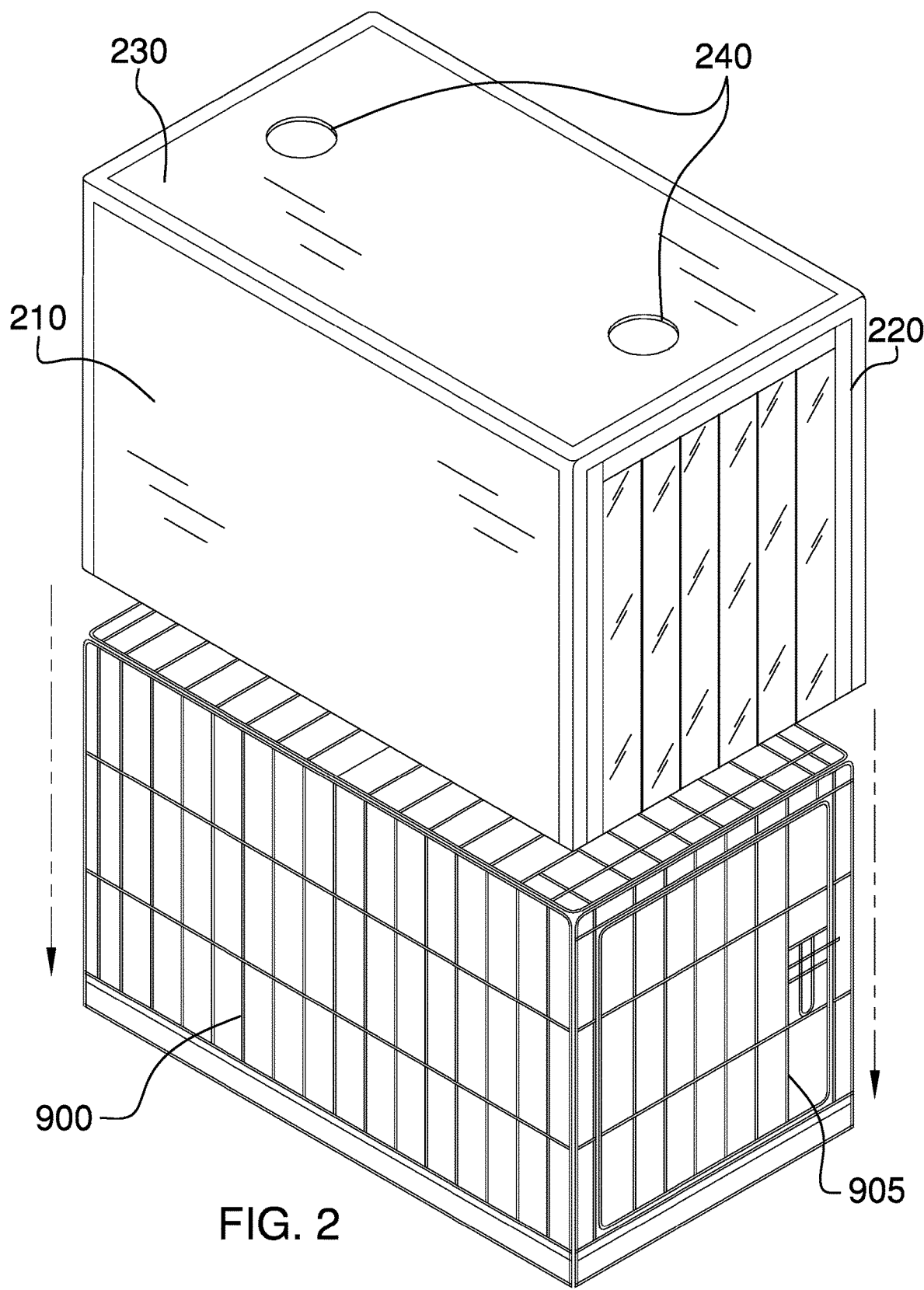
FIG. 2 is a detail view of an embodiment of the disclosure illustrating installation of the thermal cover over a crate.
Figure 3:
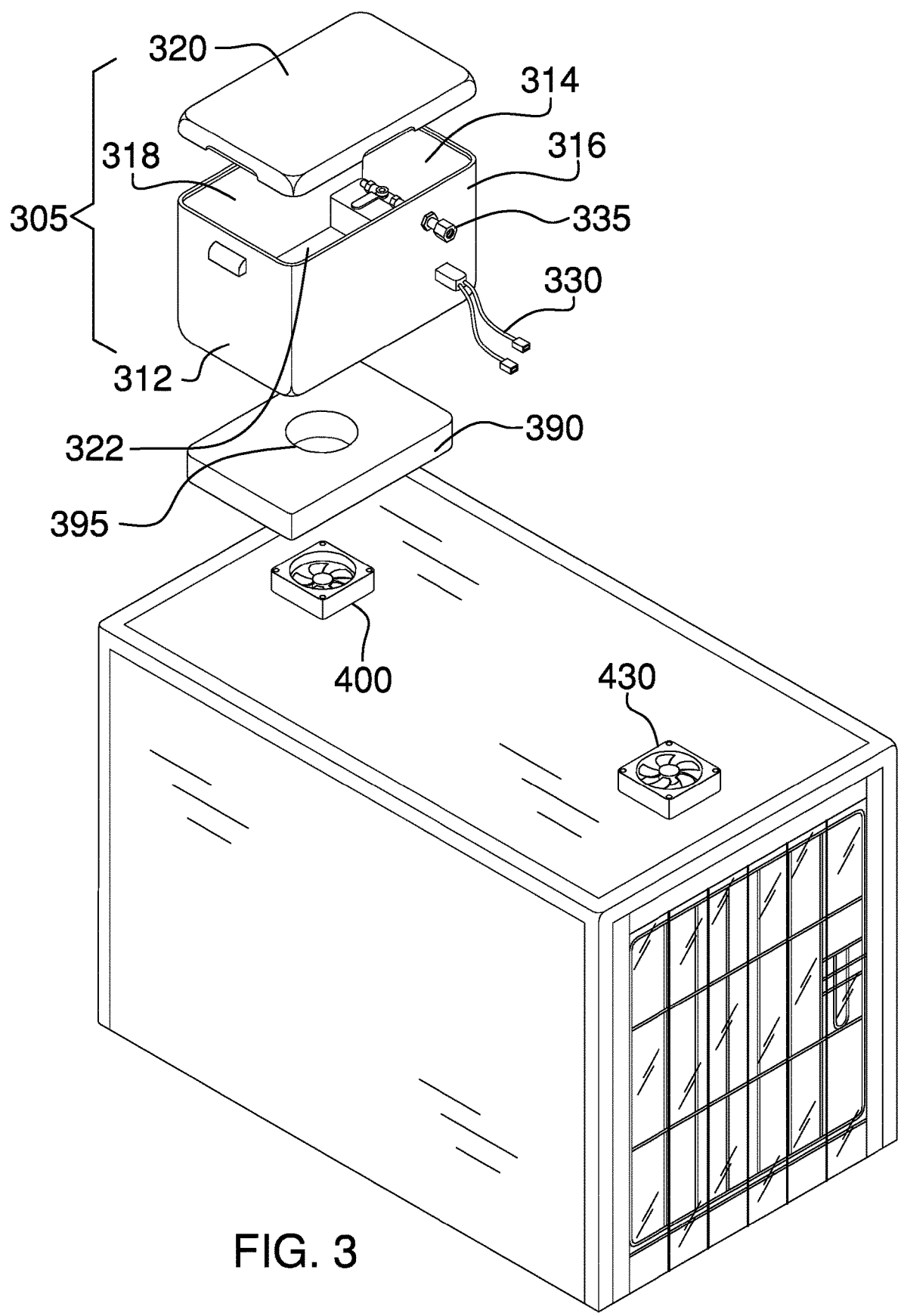
FIG. 3 is an exploded view of an embodiment of the disclosure.
Figure 4:
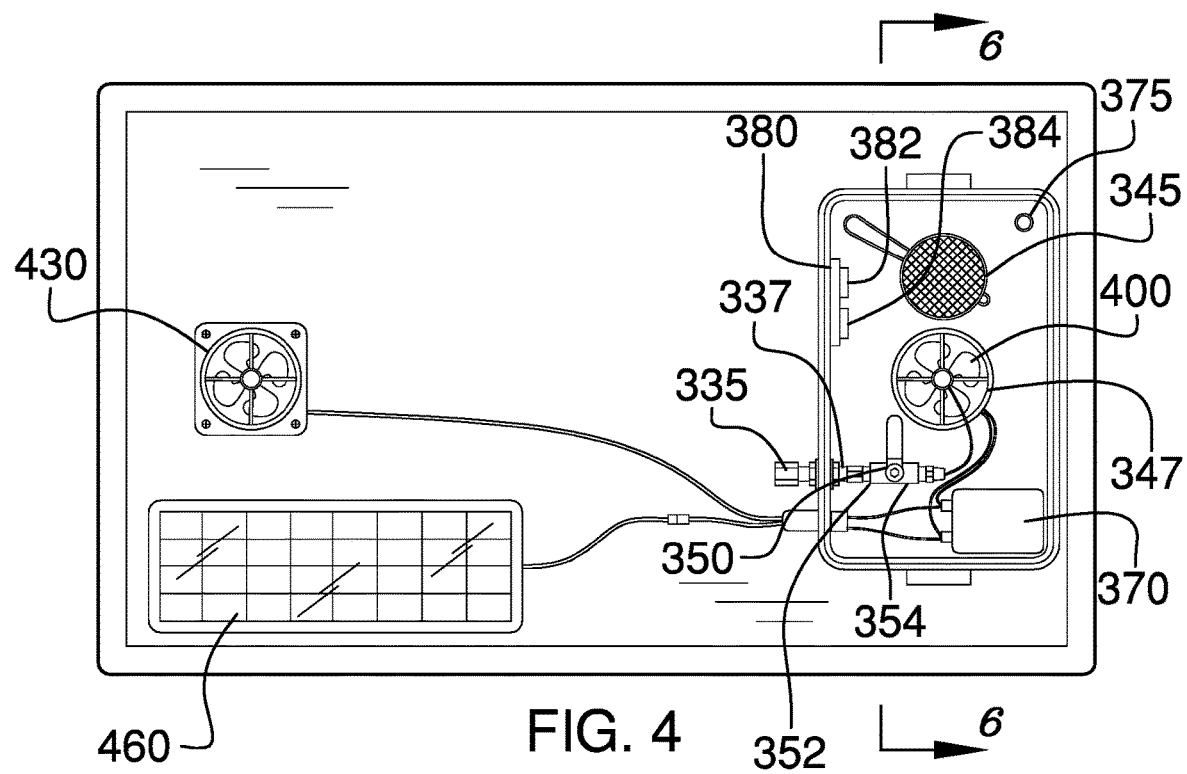
FIG. 4 is a top view of an embodiment of the disclosure.
Figure 5:
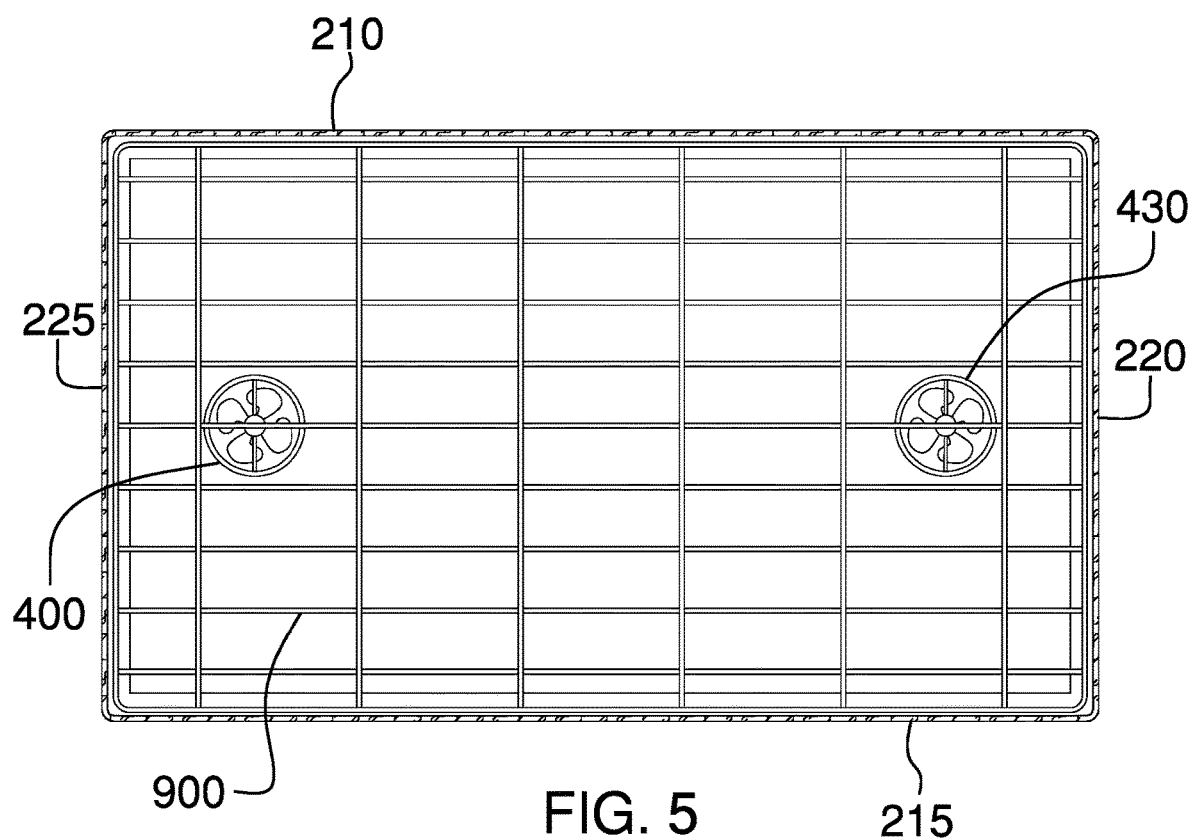
FIG. 5 is a cross-sectional view of an embodiment of the disclosure across 5-5 as shown in FIG. 1.
Figure 6:
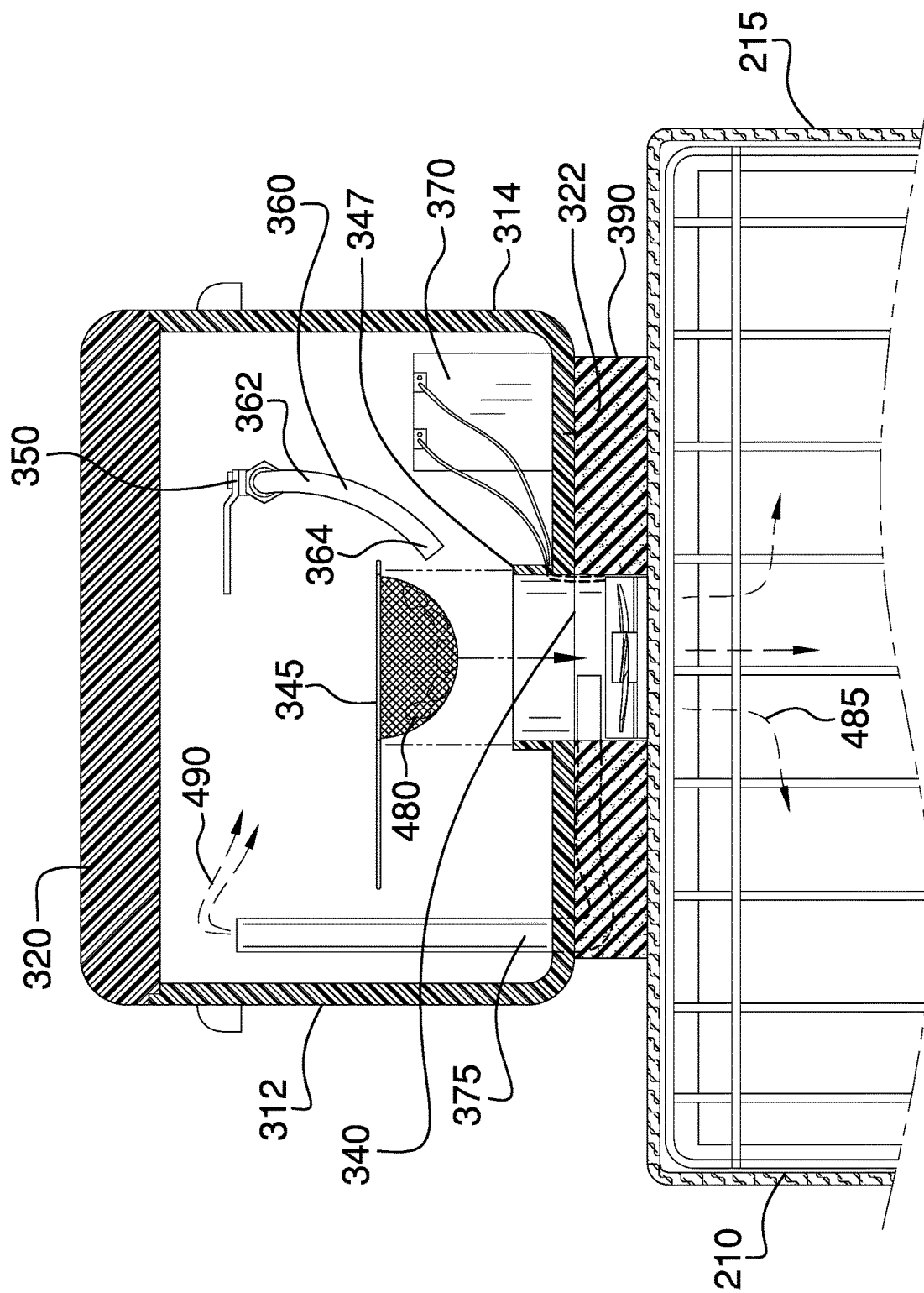
FIG. 6 is a cross-sectional view of an embodiment of the disclosure across 6-6 as shown in FIG. 4.
Figure 7:
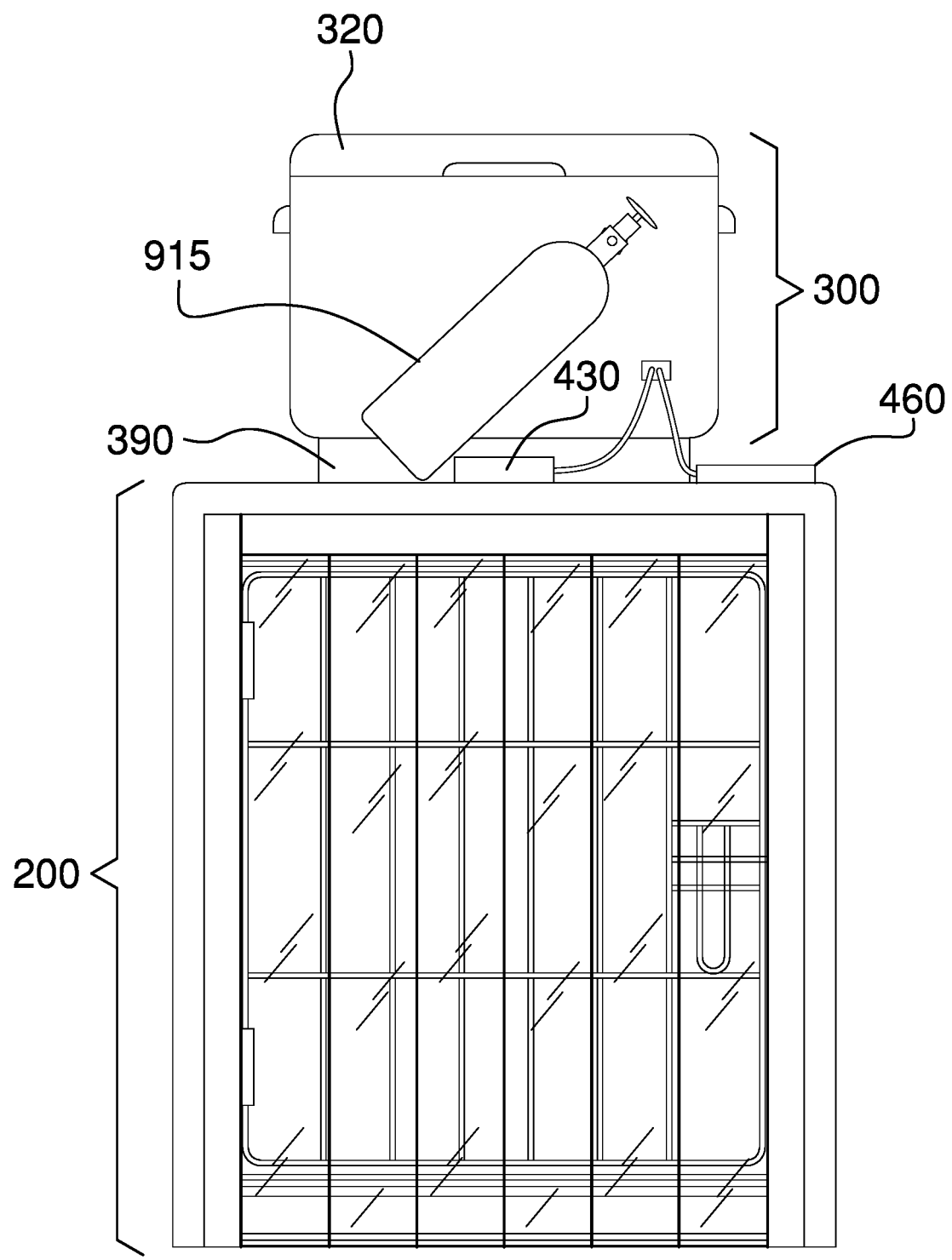
FIG. 7 is a front view of an embodiment of the disclosure.

Detailed reference will now be made to a first potential embodiment of the disclosure, which is illustrated in FIGS. 1 through 7.

The animal crate cooling system 100 (hereinafter invention) comprises a thermal cover 200, a cold air unit 300, and a first air moving device 400. The invention 100 may be adapted to cover a crate 900 for an animal and circulate cool air 485 through the crate 900.

The thermal cover 200 comprises a cover left side panel 210, a cover right side panel 215, a cover front panel 220, a cover rear panel 225, and a cover top panel 230. The thermal cover 200 may be placed over the crate 900 to surround the crate with a thermal barrier. The thermal cover 200 may insulate the crate 900 to assist in maintaining a current temperature. The left edge of the cover front panel 220 may be coupled to the front edge of the cover left side panel 210. The right edge of the cover front panel 220 may be coupled to the front edge of the cover right side panel 215. The top edge of the cover front panel 220 may be coupled to the front edge of the cover top panel 230. The left edge of the cover rear panel 225 may be coupled to the rear edge of the cover left side panel 210. The right edge of the cover rear panel 225 may be coupled to the rear edge of the cover right side panel 215. The top edge of the cover rear panel 225 may be coupled to the rear edge of the cover top panel 230. The top edge of the cover left side panel 210 may be coupled to the left edge of the cover top panel 230. The top edge of the cover right side panel 215 may be coupled to the right edge of the cover top panel 230. The cover top panel 230 may comprise one or more vent apertures 240. The one or more vent apertures 240 may be openings in the cover top panel 230 to allow passage or air 490 into and/or out of the crate 900. An air moving device may be coupled to at least one of the one or more vent apertures 240 to force the air 490 into or out of the crate 900.

An individual panel selected from the cover left side panel 210, the cover right side panel 215, the cover front panel 220, the cover rear panel 225, or the cover top panel 230 may comprise an inner vinyl layer, an outer thermal shield layer, and an insulating layer sandwiched between the inner and outer layers. The outer thermal shield layer of the individual panel may be thermally reflective. As a non-limiting example, the outer thermal shield layer of the individual panel may be composed of polyester and aluminum. As a non-limiting example, the outer thermal liner of the individual panel may be composed of polyester cotton batting.

In some embodiments, the cover front panel 220 may be removable, in whole or in part, to gain access to the crate 900 without having to remove the thermal cover 200 for the purpose of accessing a door 905 of the crate 900. As a non-limiting example, a portion of the cover front panel 220 may be coupled to the thermal cover 200 using hook and loop fasteners.

The cold air unit 300 comprises an insulated enclosure 305, a CO2 cylinder coupler 335, a hose 360, a valve 350, a dry ice basket 345, a battery 370, an insulating pad 390, and a recirculation pipe 375. The cold air unit 300 may make dry ice 480 which is used to cool the air 490 being introduced into the crate 900.

The insulated enclosure 305 comprises an enclosure left side panel 312, an enclosure right side panel 314, an enclosure front panel 316, an enclosure rear panel 318, an enclosure top 320, and an enclosure bottom 322. The left edge of the enclosure front panel 316 may be coupled to the front edge of the enclosure left side panel 312. The right edge of the enclosure front panel 316 may be coupled to the front edge of the enclosure right side panel 314. The bottom edge of the enclosure front panel 316 may be coupled to the front edge of the enclosure bottom 322. The left edge of the enclosure rear panel 318 may be coupled to the rear edge of the enclosure left side panel 312. The right edge of the enclosure rear panel 318 may be coupled to the rear edge of the enclosure right side panel 314. The bottom edge of the enclosure rear panel 318 may be coupled to the rear edge of the enclosure bottom 322. The bottom edge of the enclosure left side panel 312 may be coupled to the left edge of the enclosure bottom 322. The bottom edge of the enclosure right side panel 314 may be coupled to the right edge of the enclosure bottom 322. The enclosure top 320 may be removable for gaining access to the interior of the cold air unit 300. The enclosure bottom 322 may comprise a bottom aperture 340. The cold air unit 300 may be positioned on top of the thermal cover 200 such that the bottom aperture 340 aligns with one of the one or more vent apertures 240. The bottom aperture 340 may align with one of the one or more vent apertures 240 allowing the cool air 485 to enter the crate 900 by passing through the thermal cover 200 from the cold air unit 300.

The CO2 cylinder coupler 335 may be located on the enclosure front panel 316 outside of the insulated enclosure 305. A CO2 cylinder 915 may be attached to the CO2 cylinder coupler 335. A pipe 337 may pass from the CO2 cylinder coupler 335 through the enclosure front panel 316 and may couple to a first side 352 of the valve 350. CO2 from the CO2 cylinder 915 may pass through the CO2 cylinder coupler 335, through the pipe 337, and into the valve 350. A first end 362 of the hose 360 may be coupled to a second side 354 of the valve 350. A second end 364 of the hose 360 may be positioned above the dry ice basket 345 such that when the valve 350 is in an open position the CO2 may flow from the CO2 cylinder 915 to the second end 364 of the hose 360 and may exit the hose 360 above the dry ice basket 345. The CO2 in the CO2 cylinder 915 exists as a pressurized liquid and as the CO2 exits from the hose 360 it expands into a gas and the temperature of the CO2 drops below the temperature at which carbon dioxide freezes. The dry ice basket 345 temperature is lowered to this freezing temperature because of the placement of the hose 360 relative to the dry ice basket 345. As more of the CO2 exits the hose 360 it freezes and forms the dry ice 480 on the dry ice basket 345.

The valve 350 may control the flow of the CO2 from the CO2 cylinder 915 to the dry ice basket 345. When the valve 350 is in the open position, the CO2 may flow from the CO2 cylinder 915 to the dry ice basket 345. When the valve 350 is in a closed position, the CO2 may be prevented from flowing from the CO2 cylinder 915 to the dry ice basket 345.

The dry ice basket 345 may be located within the insulated enclosure 305 above the bottom aperture 340. The dry ice basket 345 may be coupled to a collar 347 extending up from the enclosure bottom 322. The dry ice basket 345 may accumulate the dry ice 480 produced by the CO2 exiting from the hose 360. The air 490 passing the dry ice basket 345 may be chilled by the dry ice 480 in the dry ice basket 345 and the cool air 485 may be drawn from the insulated enclosure 305 into the crate 900 by the first air moving device 400.

The battery 370 may comprise one or more energy-storage devices. The battery 370 may be a source of electrical energy to operate the first air moving device 400. The battery 370 may be replaceable or rechargeable.

The insulating pad 390 may be a rectangular section of a thermally insulating material that is located between the enclosure bottom 322 of the insulated enclosure 305 and the cover top panel 230. The insulating pad 390 may be the same length and width as the insulated enclosure 305. The insulating pad 390 may comprise a central aperture 395. The central aperture 395 may be a hole in the insulating pad 390 that is sized to surround the first air moving device 400. The insulating pad 390 may assure that more of the cool air 485 is transferred from the insulated enclosure 305 into the crate 900 than would be transferred if the insulating pad 390 was not present.

The recirculation pipe 375 may be an L-shaped pipe that allows for recirculation of the air 490 within the invention 100. The top end of the recirculation pipe 375 may extend vertically into the insulated enclosure 305 to a height that places the top end of the recirculation pipe 375 between the enclosure top 320 and the level of the dry ice basket 345. The bottom end of the recirculation pipe 375 may be positioned to align with the bottom aperture 340. The air 490 may enter the bottom end of the recirculation pipe 375 and may travel to the top end of the recirculation pipe 375 where it may exit into the insulated enclosure 305 to be cooled and blown into the crate 900.

The first air moving device 400 may be positioned on top of the thermal cover 200 directly above one of the one or more vent apertures 240. The first air moving device 400 may force the movement of the cool air 485 downwards from the insulated enclosure 305 into the crate 900. The first air moving device 400 may be electromechanical in nature. As a non-limiting example, the first air moving device 400 may be a fan. The first air moving device 400 may be energized by an electrical potential supplied from the battery 370.

A solar panel 460 may convert light into electricity. The solar panel 460 may be positioned on top of the thermal cover 200. The solar panel 460 may be electrically coupled to the cold air unit 300 via an electrical harness 330. Wiring located inside of the insulated enclosure 305 may electrically couple the electrical harness 330 to the battery 370 such that the solar panel 460 may be used to recharge the battery 370. A second air moving device 430 may be positioned on top of the thermal cover 200 directly above one of the one or more vent apertures 240. The second air moving device 430 may force the movement of the cool air 485 upwards from the crate 900 into the outside environment and may be used to pull the air 490 out of the crate 900. The second air moving device 430 may be rated at a higher cubic feet per minute (CFM) specification than the first air moving device 400 and may therefore create negative pressure within the crate 900. The second air moving device 430 may be electromechanical in nature. As a non-limiting example, the second air moving device 430 may be a fan. The second air moving device 430 may be energized by the electrical potential supplied from the battery 370 via the electrical harness 330.

In some embodiments, the cold air unit 300 may comprise a control board 380. The control board 380 may comprise a microprocessor 382 and a memory 384 wherein the memory 384 contains instructions for causing the microprocessor 382 to control the sequence and timing of the operation of the cold air unit 300. The control board 380 may further comprise one or more temperature sensors that measure the temperature within the cold air unit 300. The control board 380 may maintain a flow of the cool air 485 by controlling the rotational speed and/or direction of the first air moving device 400 and the second air moving device 430. In some embodiments, the valve 350 may be electromechanically controlled by a control signal from the control board 380 and the control board 380 may cause the dry ice 480 to be periodically regenerated by opening the valve 350 to form the dry ice 480 on the dry ice basket 345.

In use, the crate 900 is set up at a venue and the thermal cover 200 is placed over the crate 900. The first air moving device 400, the second air moving device 430, and the solar panel 460 are positioned on top of the thermal cover 200. The cold air unit 300 and the insulating pad 390 are positioned over the first air moving device 400. The electrical harness 330 is installed to couple the second air moving device 430 and the solar panel 460 with the cold air unit 300. The enclosure top 320 is removed from the insulated enclosure 305 and the valve is activated to release the CO2 into the dry ice basket 345 to form the dry ice 480. The enclosure top 320 is replaced to thermally seal the insulated enclosure 305. The first air moving device 400 and the second air moving device 430 may then cause the cool air 485 to circulate through the crate 900. The enclosure top 320 may be removed and the valve 350 may be activated repeatedly to regenerate the dry ice 480.

In embodiments with the control board 380, the valve 350 may be activated by the control board 380 to regenerate the dry ice 480 when the control board 380 senses a rising temperature within the insulated enclosure 305. The control board 380 may also manage the rotational speeds of the first air moving device 400 and the second air moving device 430 to regulate the temperature within the crate 900.

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used herein, "align" refers to the placement of two or more components into positions and orientations which either arranges the components along a straight line or within the same plane or which will allow the next step of assembly to proceed. As a non-limiting example, the next step of assembly may be to insert one component into another component, requiring alignment of the components.

As used in this disclosure, an "aperture" is an opening in a surface. Aperture may be synonymous with hole, slit, crack, gap, slot, or opening.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, a "collar" is a ring like device that is placed around an object.

As used herein, the words "couple", "couples", "coupled" or "coupling", refer to connecting, either directly or indirectly, and does not necessarily imply a mechanical connection.

As used in this disclosure, a "fan" is a mechanical device with rotating blades that is used to create a flow or current of air.

As used herein, "front" indicates the side of an object that is closest to a forward direction of travel under normal use of the object or the side or part of an object that normally presents itself to view or that is normally used first. "Rear" or "back" refers to the side that is opposite the front.

As used in this disclosure, a "hook and loop fastener" is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface.

As used herein, the word "hose" is intended to include hoses, tubing, piping, and other conduits capable of directing a flow of a gas or a liquid. When referring to a hose in this disclosure, the terms inner diameter and outer diameter are used as they would be used by those skilled in the plumbing arts.

As used in this disclosure, the word "interior" is used as a relational term that implies that an object is located or contained within the boundary of a structure or a space.

As used in this disclosure, a "pad" is a mass of soft material used as a filling, as insulation, or for protection against damage or injury. Commonly used padding materials include, but are not limited to, polyurethane foam, silicone, a polyester fill often referred to as fiberfill or polystyrene beads often referred to as stuffing beans or as bean bag chair beans.

As used in this disclosure, a "pipe" is a hollow cylindrical device that is used for transporting liquids and gases or for structural purposes. The line that connects the center of the first base of the cylinder to the center of the second base of the cylinder is referred to as the axis of the cylinder or the centerline of the pipe. When two pipes share the same centerline they are said to be aligned. In this disclosure, the terms inner diameter of a pipe and outer diameter are used as they would be used by those skilled in the plumbing arts.

As used herein, the terms "processor", "central processor", "central processing unit", "CPU", or "microprocessor" refer to a digital device that carries out the instructions comprising a computer program by performing basic arithmetic, logical, control, and input/out operations. The term "microprocessor" may additionally imply a level of miniaturization and power reduction that makes the device suitable for portable or battery operated systems.

As used in this disclosure, a "valve" is a device that is used to control the flow of a fluid (gas or liquid) through a pipe or to control the flow of a fluid into and out of a container. Some valves may have multiple ports and may allow the diverting or mixing of fluids.

As used in this disclosure, a "vent" is an opening in the structure that allows air to enter or escape.

Throughout this document references to "wire", "wires", "wired", or "wiring" may describe and/or show a single conductor when, in fact, two conductors may be required to power or control a subsystem; a convention used herein is to not show the common return conductor to which all electrical subsystems are connected—this common return conductor is a continuous electrical path and does not pass through any type of switch or other electrical component other than the possibility of passing through one or more connectors.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A animal crate cooling system comprising:
a thermal cover, a cold air unit, and a first air moving device;
wherein the animal crate cooling system is adapted to cover a crate for an animal and circulate cool air through the crate;
wherein the thermal cover comprises a cover left side panel, a cover right side panel, a cover front panel, a cover rear panel, and a cover top panel;
wherein the thermal cover is placed over the crate to surround the crate with a thermal barrier;
wherein the thermal cover insulates the crate to assist in maintaining a current temperature;
wherein the left edge of the cover front panel is coupled to the front edge of the cover left side panel;
wherein the right edge of the cover front panel is coupled to the front edge of the cover right side panel;
wherein the top edge of the cover front panel is coupled to the front edge of the cover top panel;
wherein the left edge of the cover rear panel is coupled to the rear edge of the cover left side panel;
wherein the right edge of the cover rear panel is coupled to the rear edge of the cover right side panel;
wherein the top edge of the cover rear panel is coupled to the rear edge of the cover top panel;
wherein the top edge of the cover left side panel is coupled to the left edge of the cover top panel;
wherein the top edge of the cover right side panel is coupled to the right edge of the cover top panel;
wherein the cover top panel comprises one or more vent apertures;
wherein the one or more vent apertures are openings in the cover top panel to allow passage or air into and/or out of the crate;
wherein an air moving device is coupled to at least one of the one or more vent apertures to force the air into or out of the crate.

2. The animal crate cooling system according to claim 1 wherein an individual panel selected from the cover left side panel, the cover right side panel, the cover front panel, the cover rear panel, or the cover top panel comprises an inner vinyl layer, an outer thermal shield layer, and an insulating layer sandwiched between the inner and outer layers;
wherein the outer thermal shield layer of the individual panel is thermally reflective.

3. The animal crate cooling system according to claim 2 wherein the outer thermal shield layer of the individual panel is composed of polyester and aluminum.

4. The animal crate cooling system according to claim 2 wherein the outer thermal liner of the individual panel is composed of polyester cotton batting.

5. The animal crate cooling system according to claim 2 wherein the cover front panel is removable, in whole or in part, to gain access to the crate without having to remove the thermal cover for the purpose of accessing a door of the crate.

6. The animal crate cooling system according to claim 5 wherein the cold air unit comprises an insulated enclosure, a CO2 cylinder coupler, a hose, a valve, a dry ice basket, a battery, an insulating pad, and a recirculation pipe;
wherein the cold air unit makes dry ice which is used to cool the air being introduced into the crate.

7. The animal crate cooling system according to claim 6 wherein the insulated enclosure comprises an enclosure left side panel, an enclosure right side panel, an enclosure front panel, an enclosure rear panel, an enclosure top, and an enclosure bottom;

wherein the left edge of the enclosure front panel is coupled to the front edge of the enclosure left side panel;

wherein the right edge of the enclosure front panel is coupled to the front edge of the enclosure right side panel;

wherein the bottom edge of the enclosure front panel is coupled to the front edge of the enclosure bottom;

wherein the left edge of the enclosure rear panel is coupled to the rear edge of the enclosure left side panel;

wherein the right edge of the enclosure rear panel is coupled to the rear edge of the enclosure right side panel;

wherein the bottom edge of the enclosure rear panel is coupled to the rear edge of the enclosure bottom;

wherein the bottom edge of the enclosure left side panel is coupled to the left edge of the enclosure bottom;

wherein the bottom edge of the enclosure right side panel is coupled to the right edge of the enclosure bottom;

wherein the enclosure top is removable for gaining access to the interior of the cold air unit;

wherein the enclosure bottom comprises a bottom aperture;

wherein the cold air unit is positioned on top of the thermal cover such that the bottom aperture aligns with one of the one or more vent apertures;

wherein the bottom aperture aligns with one of the one or more vent apertures allowing the cool air to enter the crate by passing through the thermal cover from the cold air unit.

8. The animal crate cooling system according to claim 7 wherein the CO2 cylinder coupler is located on the enclosure front panel outside of the insulated enclosure;

wherein a CO2 cylinder is attached to the CO2 cylinder coupler;

wherein a pipe passes from the CO2 cylinder coupler through the enclosure front panel and couples to a first side of the valve;

wherein CO2 from the CO2 cylinder passes through the CO2 cylinder coupler, through the pipe, and into the valve;

wherein a first end of the hose is coupled to a second side of the valve;

wherein a second end of the hose is positioned above the dry ice basket such that when the valve is in an open position the CO2 flows from the CO2 cylinder to the second end of the hose and exits the hose above the dry ice basket.

9. The animal crate cooling system according to claim 8 wherein the valve controls the flow of the CO2 from the CO2 cylinder to the dry ice basket;

wherein when the valve is in the open position, the CO2 flows from the CO2 cylinder to the dry ice basket;

wherein when the valve is in a closed position, the CO2 is prevented from flowing from the CO2 cylinder to the dry ice basket.

10. The animal crate cooling system according to claim 9 wherein the dry ice basket is located within the insulated enclosure above the bottom aperture;

wherein the dry ice basket is coupled to a collar extending up from the enclosure bottom;

wherein the dry ice basket accumulates the dry ice produced by the CO2 exiting from the hose;

wherein the air passing the dry ice basket is chilled by the dry ice in the dry ice basket and the cool air is drawn from the insulated enclosure into the crate by the first air moving device.

11. The animal crate cooling system according to claim 10 wherein the battery comprises one or more energy-storage devices;

wherein the battery is a source of electrical energy to operate the first air moving device;

wherein the battery is replaceable or rechargeable.

12. The animal crate cooling system according to claim 11 wherein the insulating pad is a rectangular section of a thermally insulating material that is located between the enclosure bottom of the insulated enclosure and the cover top panel;

wherein the insulating pad is the same length and width as the insulated enclosure;

wherein the insulating pad comprises a central aperture;

wherein the central aperture is a hole in the insulating pad that is sized to surround the first air moving device;

wherein the insulating pad assures that more of the cool air is transferred from the insulated enclosure into the crate than would be transferred if the insulating pad was not present.

13. The animal crate cooling system according to claim 12 wherein the recirculation pipe is an L-shaped pipe that allows for recirculation of the air within the animal crate cooling system;

wherein the top end of the recirculation pipe extends vertically into the insulated enclosure to a height that places the top end of the recirculation pipe between the enclosure top and the level of the dry ice basket;

wherein the bottom end of the recirculation pipe is positioned to align with the bottom aperture;

wherein the air enters the bottom end of the recirculation pipe and travels to the top end of the recirculation pipe where it exits into the insulated enclosure to be cooled and blown into the crate.

14. The animal crate cooling system according to claim 13 wherein the first air moving device is positioned on top of the thermal cover directly above one of the one or more vent apertures;

wherein the first air moving device forces the movement of the cool air downwards from the insulated enclosure into the crate;

wherein the first air moving device is electromechanical in nature;

wherein the first air moving device is energized by an electrical potential supplied from the battery.

15. The animal crate cooling system according to claim 14 wherein a solar panel converts light into electricity;

wherein the solar panel is positioned on top of the thermal cover;

wherein the solar panel is electrically coupled to the cold air unit via an electrical harness;

wherein wiring located inside of the insulated enclosure electrically couples the electrical harness to the battery such that the solar panel is used to recharge the battery.

16. The animal crate cooling system according to claim 15 wherein a second air moving device is positioned on top of the thermal cover directly above one of the one or more vent apertures;

wherein the second air moving device forces the movement of the cool air upwards from the crate into the outside environment and is used to pull the air out of the crate;

wherein the second air moving device is rated at a higher cubic feet per minute specification than the first air moving device and creates negative pressure within the crate;

wherein the second air moving device is electromechanical in nature;

wherein the second air moving device is energized by the electrical potential supplied from the battery via the electrical harness.

17. The animal crate cooling system according to claim 16 wherein the cold air unit comprises a control board;

wherein the control board comprises a microprocessor and a memory wherein the memory contains instructions for causing the microprocessor to control the sequence and timing of the operation of the cold air unit;

wherein the control board comprises one or more temperature sensors that measure the temperature within the cold air unit;

wherein the control board maintains a flow of the cool air by controlling the rotational speed and/or direction of the first air moving device and the second air moving device.

18. The animal crate cooling system according to claim 17 wherein the valve is electromechanically controlled by a control signal from the control board and the control board causes the dry ice to be periodically regenerated by opening the valve to form the dry ice on the dry ice basket.

* * * * *